United States Patent
Liu et al.

(10) Patent No.: US 9,805,230 B2
(45) Date of Patent: Oct. 31, 2017

(54) METHOD FOR CONTROLLING NFC TAG AND CONTROLLED NFC TAG

(71) Applicant: GoerTek Inc., Weifang (CN)

(72) Inventors: Yang Liu, Weifang (CN); Liguo Chen, Weifang (CN); Xiaolong Xu, Weifang (CN)

(73) Assignee: Goertek Inc., Weifang, Shandong (CN)

( * ) Notice: Subject to any disclaimer, the term of this patent is extended or adjusted under 35 U.S.C. 154(b) by 0 days.

(21) Appl. No.: 14/910,346

(22) PCT Filed: Aug. 6, 2014

(86) PCT No.: PCT/CN2014/083781
§ 371 (c)(1),
(2) Date: Feb. 5, 2016

(87) PCT Pub. No.: WO2015/018336
PCT Pub. Date: Feb. 12, 2015

(65) Prior Publication Data
US 2016/0188925 A1    Jun. 30, 2016

(30) Foreign Application Priority Data
Aug. 7, 2013   (CN) .......................... 2013 1 0342086

(51) Int. Cl.
  *G06K 7/10* (2006.01)
  *G06K 19/073* (2006.01)
  *G06K 19/077* (2006.01)

(52) U.S. Cl.
  CPC ..... *G06K 7/10316* (2013.01); *G06K 7/10158* (2013.01); *G06K 19/073* (2013.01); *G06K 19/07773* (2013.01)

(58) Field of Classification Search
  CPC ........... G06K 7/10316; G06K 7/10158; G06K 19/073; H04B 5/0081; H04B 5/0031;
  (Continued)

(56) References Cited

U.S. PATENT DOCUMENTS

2010/0123561 A1   5/2010  Nam et al.
2011/0241837 A1*  10/2011 Suzuki ................. G06K 7/0008
                                                340/10.1
(Continued)

FOREIGN PATENT DOCUMENTS

CN     102215053 A    10/2011
CN     103035082 A     4/2013
(Continued)

OTHER PUBLICATIONS

International Search Report Report dated Nov. 15, 2014 in connection with PCT/CN2014/083781.
(Continued)

*Primary Examiner* — Kabir A Timory
(74) *Attorney, Agent, or Firm* — Troutman Sanders LLP

(57) ABSTRACT

A method for controlling NFC tag and a controlled NFC tag, said method comprising: producing an on or off control signal causing an electronic switch to close or to open, the off or on control signal being exerted upon the electronic switch in parallel connection with the NFC antenna coil; by means of an enabling signal or a disabling signal emitted by the electronic switch, enabling or disabling transfer of electromagnetic energy coupled with the NFC antenna coil to the NFC tag chip. The controlled NFC tag comprises: an NFC tag body, an electronic switch in parallel connection with the NFC antenna coil, and an electronic switch control circuit producing on or off control signals for the electronic switch. The present invention allows information inside the NFC chip to be accessed according to certain conditions, thus avoiding unnecessary operations while enhancing the security of information stored in the NFC chip.

7 Claims, 3 Drawing Sheets

(58) Field of Classification Search
CPC ...... H04B 5/0037; H04B 5/0062; H04B 5/02; H04B 5/0012; H04B 5/0068; H04B 5/00; H04B 1/38; H04B 5/0093; H04B 5/0025
See application file for complete search history.

(56) References Cited

U.S. PATENT DOCUMENTS

2011/0292991 A1* 12/2011 Muramatsu ........ G06K 19/0723
375/232
2013/0043835 A1 2/2013 Yoon

FOREIGN PATENT DOCUMENTS

| CN | 103226724 A | 7/2013 |
| --- | --- | --- |
| CN | 103413165 A | 11/2013 |
| CN | 203366368 U | 12/2013 |

OTHER PUBLICATIONS

Written Opinion dated Nov. 15, 2014 in connection with PCT/CN2014/083781.
Third Office Action dated Feb. 8, 2017 in connection with Chinese Application No. 201310342086.1.

\* cited by examiner

METHOD FOR CONTROLLING NFC TAG AND CONTROLLED NFC TAG

The present application is the U.S. National Phase of International Patent Application Serial No. PCT/CN2014/083781, filed Aug. 6, 2014, which claims priority to Chinese Patent Application Serial No. 201310342086.1, filed Aug. 7, 2013. The contents of the foregoing applications are hereby incorporated by reference in their entireties.

TECHNICAL FIELD

The present invention relates to the technical field of near field communication and, more specifically, to a method for controlling NFC tag and a controlled NFC tag.

BACKGROUND

With the development of wireless communication technology, particularly the near field communication technology, data exchange can be carried out between electronic equipments within a limited range. The near field communication (NFC) technology is a short-distance high-frequency wireless communication technology developed from the radio frequency identification (RFID) technology. Compared to infrared communication and Bluetooth communication, NFC adopts a unique signal attenuation technology to be able to communicate within a very short distance (such as 10 cm). NFC is high in security due to short communication distance, and therefore, it is very suitable to be applied to identity recognition, secure payment, etc.

The NFC communication equipment has three operation modes, i.e., tag mode, card reader mode and point-to-point mode. The tag mode is also known as card mode which is a passive mode. The typical example of the NFC communication equipment operating under the tag mode is ordinary NFC tag which can store information such as personal information, payment information, Bluetooth address information and WIFI address information for reading and is suitable for being applied to posters, identity recognition, wireless secure payment, Bluetooth pairing, WIFI pairing, etc. The card reader mode is an active mode. The NFC communication equipment (such as NFC mobile phone) operating under the card reader mode can read out the stored information from the NFC tag, or even can write the information into the NFC tag. The point-to-point mode is used for data exchange. Specifically, two NFC communication equipments operating under the point-to-point mode can realize point-to-point data transmission, such as downloading music and exchanging pictures.

FIG. 1 is a schematic diagram, showing the operating process of ordinary NFC card reader and NFC tag. As shown in FIG. 1, the ordinary NFC tag comprises an NFC tag chip and an NFC antenna coil. When the NFC card reader is close to the NFC tag, the NFC card reader emits electromagnetic energy to the NFC tag, the NFC antenna coil of the NFC tag is coupled with the electromagnetic energy and transfers the electromagnetic energy to the NFC tag chip which is connected with the NFC antenna coil, and the NFC tag chip converts the electromagnetic energy into power source required by inside circuits such as microcontroller, modem and memory through a rectifying circuit. When circuits such as microcontroller, modem and memory start to work after power on, the information stored in the NFC tag chip can be transmitted to the NFC card reader through the NFC antenna coil.

As the carrier frequency the NFC uses is 13.56 MHz and the read-write distance is short, the coupling mode of the NFC tag chip and the NFC card reader is magnetic field coupling, and coils can be used as the NFC antennas.

One advantage of the ordinary NFC tag is that it does not need power source, and the power source can be formed by receiving the electromagnetic energy emitted by the NFC card reader. However, the problem is that, as long as the NFC card reader is close to the NFC tag, the NFC tag will be activated, and the stored information will be automatically transmitted to the NFC card reader, which is not expected in some occasions. For example, in a Bluetooth headset equipped with the ordinary NFC tag, the Bluetooth headset pairing information such as Bluetooth address is stored in the NFC tag. When electronic equipment (such as NFC mobile phone) equipped with the NFC card reader is closed to the Bluetooth headset equipped with the NFC tag, the electronic equipment will read the headset pairing information such as Bluetooth address stored in the NFC tag of the Bluetooth headset through the NFC card reader so as to pair with the Bluetooth headset. In this situation, if the electronic equipment close to the Bluetooth headset, it can still read the pairing information stored in the Bluetooth headset even if the Bluetooth headset is turned off, thus initiating the Bluetooth protocol to pair with the Bluetooth headset actively.

As mentioned above, although the pairing will not be successful finally as the Bluetooth headset is turned off, the NFC card reader reading the information stored in the NFC tag unconditionally will cause some unnecessary operations and will affect the information security.

SUMMARY

The present invention is made to solve the existing problems in the prior art, aiming to provide a method for controlling NFC tag and a controlled NFC tag so as to read the information stored in the NFC tag chip conditionally, thus avoiding some unnecessary operations and enhancing the security of information stored in the NFC tag chip.

In order to achieve the above purposes, one aspect of the present invention provides a method for controlling NFC tag, the method comprising: generating an off or an on control signal causing an electronic switch to open or to close; applying the off control signal or the on control signal to the electronic switch which is connected in parallel with the NFC antenna coil of the NFC tag, enabling or disabling the electromagnetic energy coupled with the NFC antenna coil to be transferred to the NFC tag chip of the NFC tag through an enabling signal or a disabling signal emitted by the electronic switch.

Another aspect of the present invention provides a controlled NFC tag, comprising: an NFC tag body, comprising an NFC tag chip and an NFC antenna coil; an electronic switch, comprising a first connection terminal, a second connection terminal and a control terminal, the first connection terminal and the second connection terminal being connected with two terminals of the NFC antenna coil, respectively; an electronic switch control circuit, comprising an input terminal and an output terminal for an enabling or disabling signal, the output terminal being connected with the control terminal of the electronic switch, wherein, when the enabling signal or the disabling signal is input from the input terminal of the electronic switch control circuit, the output terminal of the electronic switch control circuit outputs the off control signal or on control signal in response, and the off control signal or the on control signal is exerted upon the control terminal of the electronic switch, so that the first connection terminal and the second connection terminal of the electronic switch are disconnected or connected correspondingly, thus correspondingly enabling or disabling the electromagnetic energy coupled with the NFC antenna coil to be transferred to the NFC tag chip.

It can be seen from the above description, in the method for controlling NFC tag and the controlled NFC tag provided in the present invention, the information stored in the NFC tag chip can be read conditionally by setting the electronic switch, thus avoiding some unnecessary operations and enhancing the security of information stored in the NFC tag chip.

Further, the method for controlling NFC tag and the controlled NFC tag provided in the present invention can be applied to various occasions, particularly to Bluetooth headsets, so that the information embedded in the NFC tag chip cannot be read when the Bluetooth headset is turned off.

DETAILED DESCRIPTION

Figure 1:
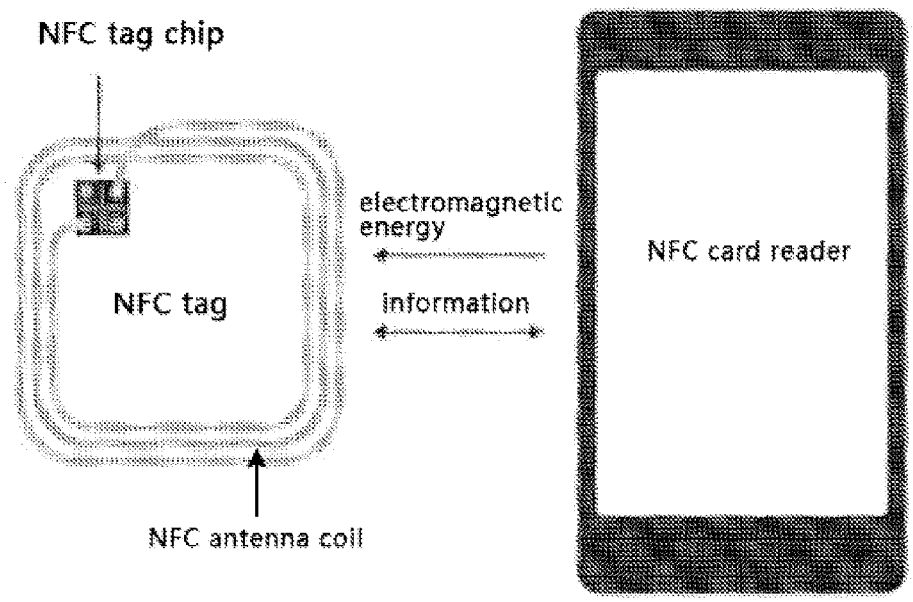
FIG. 1 is a schematic diagram, showing the operating process of NFC card reader and NFC tag.

The present invention is described in detail in connection with the accompanying drawings and specific embodiments.

As mentioned above, the information stored in the NFC tag is read unconditionally, which will easily cause some unnecessary operations and affect the security of information stored in the NFC tag. In the present invention, by setting the electronic switch, the information stored in the NFC tag chip can be read conditionally, thus avoiding some unnecessary operations and enhancing the security of information stored in the NFC tag chip.

In the following description, certain exemplary embodiments of the present invention are described only by means of illustration. It is undoubtedly that, those of ordinary skill in the art can realize the embodiments can be modified in various ways without departing from the spirit and scope of the present invention. Therefore, the accompanying drawings and the description are illustrative in essence, not to limit the scope of protection of the claims. When one device or terminal is called to be connected with another device or terminal, the device or terminal can be directly connected with the other device or terminal, or another device may be connected between the device or terminal and the other device or terminal. In addition, in this specification, like reference numerals in the accompanying drawings indicate like or similar parts.

Figure 2:
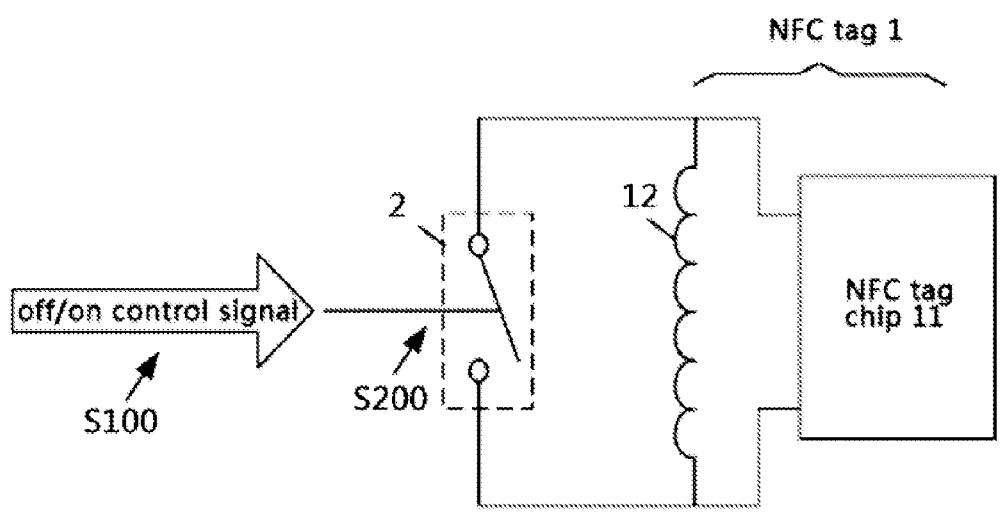
FIG. 2 is a schematic diagram, showing the process of the method for controlling NFC tag provided in the present invention.

In order to describe the method for controlling NFC tag provided in the present invention, FIG. 2 shows the operating process for controlling NFC tag according to the embodiment of the present invention.

As shown in FIG. 2, NFC tag 1 is the ordinary NFC tag described in FIG. 1 above, comprising an NFC tag chip 11 and an NFC antenna coil 12. In addition, an electronic switch 2 is parallel connected to two terminals of the NFC antenna coil 12. In the method for controlling NFC tag provided in the present invention, first, in step S100, an off control signal or on control signal causing the electronic switch to open or to close is generated; second, in step S200, the off control signal or on control signal is exerted upon the electronic switch 2 connected in parallel with the NFC antenna coil 12 of the NFC tag 1, and an enabling signal or a disabling signal is emitted by the electronic switch 2, thus enabling or disabling the electromagnetic energy coupled with the NFC antenna coil 12 be transferred to the NFC tag chip 11.

Specifically, the open of the electronic switch 2 does not change the attribute of the NFC antenna coil 12, while the close of the electronic switch 2 changes the attribute of the NFC antenna coil 12. Wherein, when the electronic switch 2 opens, it emits an enabling signal, thus enabling the electromagnetic energy coupled with the NFC antenna coil to be transferred to the NFC tag chip of the NFC tag; when the electronic switch 2 closes, it emits a disabling signal, thus disabling the electromagnetic energy coupled with the NFC antenna coil to be transferred to the NFC tag chip of the NFC tag.

That is, when the electronic switch 2 opens, the impedance thereof is high. At this time, the load of the NFC antenna coil 12 is only the rear-stage NFC tag chip 11. And then, all of the electromagnetic energy coupled with the NFC antenna coil 12 can be transferred to the rear-stage NFC tag chip 11, thus ensuring normal wireless communication between the NFC card reader and the NFC tag 1. When the electronic switch 2 is on (i.e., closed), the impedance thereof is low and can short-circuit the NFC antenna coil 12. And then, the electromagnetic energy coupled with the NFC antenna coil 12 cannot be transferred to the rear-stage NFC tag chip 11, thus disabling wireless communication between the NFC card reader and the NFC tag 1, and causing the NFC card reader failing to read the information stored in the NFC tag chip 11.

Further, the off control signal or the on control signal can be generated by inputting the enabling signal or disabling signal to the electronic switch control circuit. Specifically, controlling the opening or closing of the electronic switch needs off control signal or on control signal with high voltage level. Therefore, the electronic switch control circuit can comprise a booster circuit to boost the voltage level provided by the external power source, or to boost the voltage level of the enabling signal or the disabling signal, or the voltage level generated by the enabling signal or the disabling signal, thus generating off control signal or on control signal meeting the requirements.

In addition, the electronic switch 2 can be mainly composed of JFET (Junction Field-effect Transistor) or MOSFET (Metal-Oxide-Semiconductor Field Effect Transistor). The JFET comprises n-channel and p-channel JFET. The MOSFET comprises n-channel and p-channel enhancement-type MOSFET and n-channel and p-channel depletion-type MOSFET.

Figure 3:
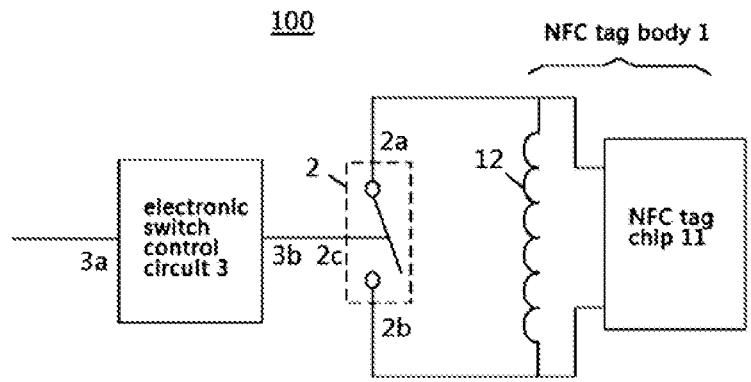
FIG. 3 is a circuit block diagram, showing the structure of the controlled NFC tag provided in the present invention.

FIG. 3 is a circuit block diagram, showing the structure of the controlled NFC tag of the present invention. As shown in FIG. 3, the controlled NFC tag 100 of the present invention comprises an NFC tag body 1, an electronic switch 2 and an electronic switch control circuit 3.

The NFC tag body 1 is the ordinary NFC tag shown in FIG. 1 above, comprising an NFC tag chip 11 and an NFC antenna coil 12 connected with the NFC tag chip 11.

The electronic switch 2 comprises a first connection terminal 2a, a second connection terminal 2b and a control terminal 2c, wherein, the first connection terminal 2a and the second connection terminal 2b are connected with two terminals of the NFC antenna coil 12, respectively.

The electronic switch control circuit 3 has an input terminal 3a and an output terminal 3b for an enabling or disabling signal, the output terminal 3b being connected with the control terminal 2c of the electronic switch 2.

The NFC tag body 1, the electronic switch 2 and the electronic switch control circuit 3 can be discrete units. The electronic switch 2 can also be integrated with the NFC tag chip 11, or, both the electronic switch 2 and the electronic switch control circuit 3 can be integrated with the NFC tag chip 11.

When the enabling signal or the disabling signal is input from the input terminal 3a of the electronic switch control circuit 3, the output terminal 3b of the electronic switch control circuit 3 outputs an off control signal or on control signal in response. The off control signal or on control signal is exerted upon the control terminal 2c of the electronic switch 2, so that the first connection terminal 2a and the second connection terminal 2b of the electronic switch 2 are disconnected or connected correspondingly. That is, when the enabling signal is input from the input terminal 3a of the electronic switch control circuit 3, the off control signal is output from the output terminal 3b of the electronic switch control circuit 3 and exerted upon the control terminal 2c of the electronic switch 2, so that the electronic switch 2 opens. When the disabling signal is input from the input terminal 3a of the electronic switch control circuit 3, the on control signal is output from the output terminal 3b of the electronic switch control circuit 3 and exerted upon the control terminal 2c of the electronic switch 2, so that the electronic switch 2 is on (i.e., closed).

When the electronic switch 2 opens, the impedance thereof is high. At this time, the load of the NFC antenna coil 12 is only the rear-stage NFC tag chip 11. And then, all of the electromagnetic energy coupled with the NFC antenna coil 12 can be transferred to the rear-stage NFC tag chip 11, thus ensuring normal wireless communication between the NFC card reader and the NFC tag body 1. When the electronic switch 2 is on (i.e., closed), the impedance thereof is low and can short-circuit the NFC antenna coil 12. And then, the electromagnetic energy coupled with the NFC antenna coil 12 cannot be transferred to the rear-stage NFC tag chip 11, thus disabling wireless communication between the NFC card reader and the NFC tag body 1, and causing the NFC card reader failing to read the information stored in the NFC tag chip 11.

Generally, as controlling the opening or closing of the electronic switch 2 needs off control signal or on control signal with high voltage level, the electronic switch control circuit 3 can comprise a booster circuit to output off control signal or on control signal sufficient to enable the electronic switch 2 to open or close.

FIGS. 4a-4d are circuit block diagrams, showing four exemplary structures of the electronic switch control circuit in the controlled NFC tag of the present invention, respectively.

Example 1

Figure 4A:
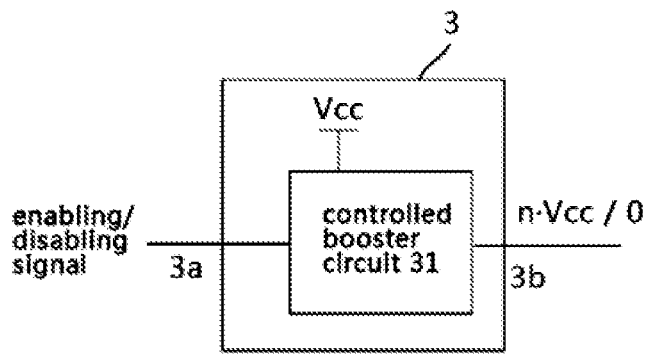
FIGS. 4a-4d are circuit block diagrams, showing four exemplary structures of the electronic switch control circuit in the controlled NFC tag provided in the present invention, respectively.

As shown in FIG. 4a, the electronic switch control circuit 3 comprises a controlled booster circuit 31. When the enabling/disabling signal is input into the controlled booster circuit 31 through the input terminal 3a of the electronic switch control circuit 3, the controlled booster circuit 31 can output off/on control signal through the output terminal 3b, such as nVcc/0, wherein, Vcc is the supply voltage provided to the controlled booster circuit 31, n is a boosting coefficient greater than 1.

Example 2

Figure 4B:
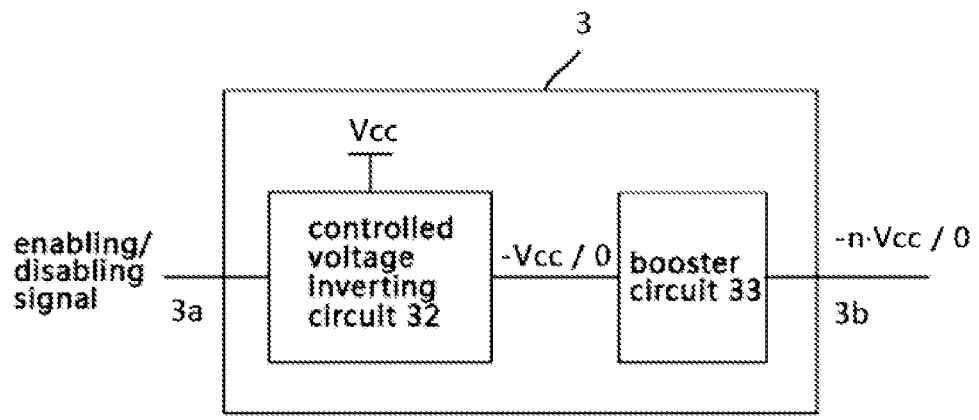

As shown in FIG. 4b, the electronic switch control circuit 3 comprises a controlled voltage inverting circuit 32 and a booster circuit 33. When the enabling/disabling signal is input into the controlled voltage inverting circuit 32 through the input terminal 3a of the electronic switch control circuit 3, the controlled voltage inverting circuit 32 outputs voltage, for example −Vcc/0, wherein, Vcc is the supply voltage provided to the controlled voltage inverting circuit 32. After being boosted by the booster circuit 33, the output voltage of the controlled voltage inverting circuit 32 is converted into off/on control signal −nVcc/0 and output through the output terminal 3b.

Example 3

Figure 4C:
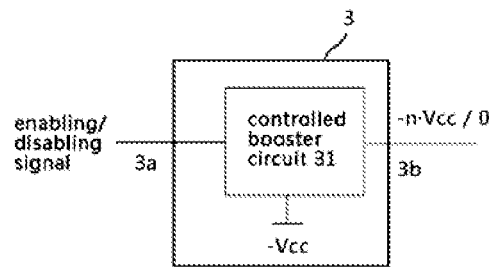

As shown in FIG. 4c, the electronic switch control circuit 3 comprises a controlled booster circuit 31. When the enabling/disabling signal is input into the controlled booster circuit 31 through the input terminal 3a of the electronic switch control circuit 3, the controlled booster circuit 31 can output off/on control signal through the output terminal 3b, such as −nVcc/0, wherein −Vcc is the supply voltage provided to the controlled booster circuit 31.

Example 4

Figure 4D:
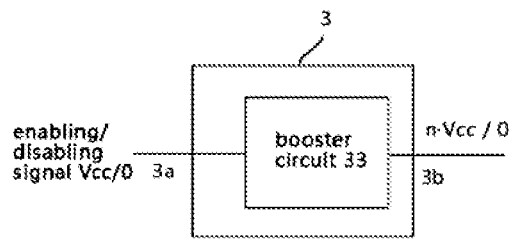

As shown in FIG. 4d, the electronic switch control circuit 3 comprises a booster circuit 33. In this embodiment, the enabling/disabling signal is used as a control signal as well as a supply signal. When the enabling/disabling signal (such as Vcc/0) is input into the booster circuit 33 through the input terminal 3a of the electronic switch control circuit 3, the booster circuit 33 outputs off/on control signal through the output terminal 3b, such as nVcc/0.

What needs to be noted is that, various implementations of the controlled booster circuit 31, the controlled voltage inverting circuit 32 and the booster circuit 33 are known to persons skilled in the art, thus a detailed description thereof will be omitted. In some applications, it is expected that the NFC tag chip of the controlled NFC tag can be read when the electronic equipment equipped with the controlled NFC tag provided in the present invention is powered on, and the NFC tag chip of the controlled NFC tag cannot be read when the electronic equipment is powered off. In this situation, the enabling signal can be a non-zero voltage signal, and the disabling signal can be a 0V voltage signal.

It can be seen from the above specific embodiments of the electronic switch control circuit, different off/on control signals required by off/on control of various electronic switches can be output by regulating the structure of the electronic switch control circuit.

The electronic switch 2 can be composed of various field effect transistors. In some applications of the present invention, it is expected that the electronic switch 2 is a normally-closed switch, that is, when the control terminal has no control signals (for example, when powered off, the control signal is 0V), the electronic switch 2 is in the state of on (i.e., closed), and when the control terminal has control signals (for example, when powered on), the electronic switch 2 is in the state of off. Therefore, in some embodiments of the present invention, the normally-closed electronic switch can be composed of n-channel or p-channel JFET and/or n-channel or p-channel depletion-type MOSFET. However, the electronic switch of the present invention is not limited thereto. Hereinafter, the exemplary structure of the electronic switch 2 is described by examples of the n-channel JFET and n-channel depletion-type MOSFET.

FIGS. 5*a*-5*d* are circuit diagrams, showing two embodiments of the electronic switch of the controlled NFC tag provided in the present invention, respectively.

Figure 5A:
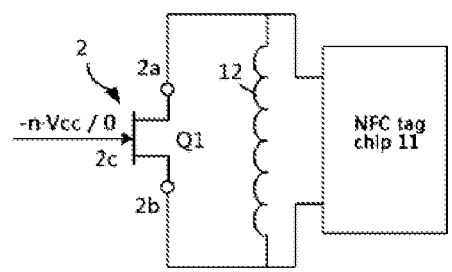
FIGS. 5a-5b are circuit diagrams, showing two embodiments of the electronic switch in the controlled NFC tag provided in the present invention, respectively.

One embodiment is shown in FIG. 5*a*. The electronic switch 2 comprises an n-channel JFET (Q1), wherein the grid electrode of the JFET is the control terminal 2*c* of the electronic switch 2, and the source electrode and drain electrode of the JFET are the first connection terminal 2*a* and the second connection terminal 2*b* of the electronic switch 2.

In this situation, it requires that the negative voltage provided to the control terminal 2*c* of the electronic switch 2 is large enough, for example, −nVcc, so as to pinch off the channel of the n-channel JFET (Q1), that is, to open the electronic switch 2, thus the NFC card reader can communicate normally with the NFC tag. Therefore, the electronic switch control circuit 3 described above with reference to FIG. 4*b* and FIG. 4*c* can be selected to control the opening and closing of the electronic switch 2 in this embodiment.

Figure 5B:
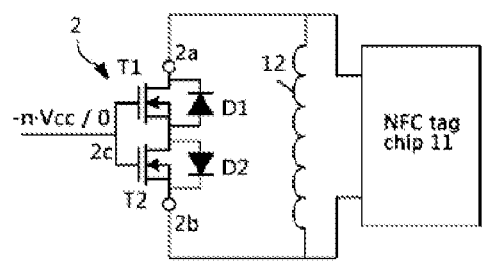

The other embodiment is shown in FIG. 5*b*. The electronic switch 2 comprises two tandem n-channel depletion-type MOSFETs (T1 and T2) and two protection diodes (D1 and D2) connected in parallel with the two depletion-type MOSFETs, respectively, wherein, the grid electrodes of the two depletion-type MOSFETs (T1 and T2) together constitute the control terminal 2*c* of the electronic switch 2.

According to international standards and features of the NFC, under the standard framework, the peak value of the transient voltage across the NFC antenna coil 12 coupled with the electromagnetic energy may reach a maximum value 10V, or even exceeds 10V. The two protection diodes (D1 and D2) can prevent the two n-channel depletion-type MOSFETs (T1 and T2) from being damaged by high voltage. Specifically, due to protective connection of D1 and D2 (i.e., back-to-back or face-to-face connection of D1 and D2), when the voltage across the NFC antennal coil 12 is high, at the same moment, one transistor of T1 and T2 only bear the voltage not more than the reverse breakdown voltage of D1 or D2, and the other transistor is short-circuited.

Similarly, the electronic switch control circuit 3 described above with reference to FIG. 4*b* and FIG. 4*c* can be selected to control the opening and closing of the electronic switch 2 in this embodiment.

The controlled NFC tag 100 provided in the present invention can be applied to various occasions, particularly, to Bluetooth headsets. For example, in the situation that the Bluetooth headset is equipped with the controlled NFC tag provided in the present invention, if the Bluetooth headset is in the state of power-on, then the enabling signal (such as Vcc) is exerted upon the input terminal of the electronic switch control circuit of the controlled NFC tag, so that the electronic switch of the controlled NFC tag is off. At this moment, when the electronic equipment (such as NFC mobile phone) equipped with the NFC card reader is close to the Bluetooth headset, the electronic equipment can read the headset pairing information such as Bluetooth address stored in the NFC tag chip of the Bluetooth headset so as to pair with the Bluetooth headset. If the Bluetooth headset is in the state of power-off, then the disabling signal (such as 0V) is exerted upon the input terminal of the electronic switch control circuit of the controlled NFC tag, so that the electronic switch of the controlled NFC tag is on (closes). At this moment, when the electronic equipment (such as NFC mobile phone) equipped with the NFC card reader is close to the Bluetooth headset, the electronic equipment cannot read the pairing information stored in the NFC tag chip of the Bluetooth headset, so that it cannot pair with the Bluetooth headset. Thus, unnecessary operations can be avoided, and the security of information stored in the NFC tag chip can be enhanced.

As described above, the method for controlling NFC tag and the controlled NFC tag provided by the present invention are described by way of examples with reference to the accompanying drawings. However, it should be understood by those skilled in the art that various improvements can be made to the method for controlling NFC tag and the controlled NFC tag provided by the present invention described above without depart from the contents of the present invention. Accordingly, the scope of protection of the present invention is determined by the contents of the appended claims.

The invention claimed is:

1. A method for near field communication (NFC) tag control for pairing with a bluetooth headset, comprising:
   generating an off control signal or an on control signal causing an electronic switch to open or to close;
   applying the off control signal or the on control signal to the electronic switch connected in parallel with an NFC antenna coil of the NFC tag, wherein
   when the off control signal is applied to the electronic switch connected in parallel with the NFC antenna coil of the NFC tag, electromagnetic energy coupled with the NFC antenna coil is transferred to an NFC tag chip of the NFC tag so as to enable wireless communication between a NFC card reader and the NFC tag, and
   when the on control signal is applied to the electronic switch connected in parallel with the NFC antenna coil of the NFC tag, the NFC antenna coil is short-circuited, and the electromagnetic energy coupled with the NFC antenna coil is not transferred to the NFC tag chip of the NFC tag so as to disable the wireless communication between the NFC card reader and the NFC tag, such that information stored in the NFC tag chip is not read by the NFC card reader;
   wherein the off control signal or the on control signal is generated by inputting an enabling signal or a disabling signal into an electronic switch control circuit comprising a booster circuit,
   wherein the enabling signal is a non-zero voltage signal, and the disabling signal is a 0V voltage signal, and
   wherein the electronic switch is a normally-closed switch.

2. The method for NFC tag control for pairing with a bluetooth headset according to claim 1, wherein,
   the electronic switch is integrated with the NFC tag chip, or, the electronic switch and the electronic switch control circuit are integrated with the NFC tag chip.

3. The method for NFC tag control for pairing with a bluetooth headset according to claim 1, wherein,
   the electronic switch is composed of a Junction Field-effect Transistor (JFET) or a Metal-Oxide-Semiconductor Field Effect Transistor (MOSFET).

4. A controlled near field communication (NFC) tag for pairing with a bluetooth headset, comprising:

an NFC tag body, comprising an NFC tag chip and an NFC antenna coil;

an electronic switch, comprising a first connection terminal, a second connection terminal and a control terminal, the first connection terminal and the second connection terminal being connected with two terminals of the NFC antenna coil, respectively;

an electronic switch control circuit, comprising an input terminal and an output terminal for an enabling or disabling signal, the output terminal being connected with the control terminal of the electronic switch, wherein the electronic switch control circuit comprises a booster circuit so as to input the off control signal or the on control signal causing the electronic switch to open or to close, wherein, when the enabling or disabling signal is input from the input terminal of the electronic switch control circuit, the output terminal of the electronic switch control circuit outputs an off control signal or an on control signal in response, and the off control signal or the on control signal is exerted upon the control terminal of the electronic switch, so that the first connection terminal and the second connection terminal of the electronic switch are disconnected or connected correspondingly, wherein when the off control signal is exerted upon the control terminal of the electronic switch, and the first connection terminal and the second connection terminal of the electronic switch are disconnected, electromagnetic energy coupled with the NFC antenna coil is transferred to an NFC tag chip of the NFC tag so as to enable wireless communication between a NFC card reader and the NFC tag, and when the on control signal is exerted upon the control terminal of the electronic switch, and the first connection terminal and the second connection terminal of the electronic switch are connected, the NFC antenna coil is short-circuited, and the electromagnetic energy coupled with the NFC antenna coil is not transferred to the NFC tag chip of the NFC tag so as to disable the wireless communication between the NFC card reader and the NFC tag, such that information stored in the NFC tag chip is not read by the NFC card reader, wherein the enabling signal is a non-zero voltage signal, and the disabling signal is a 0V voltage signal, and wherein the electronic switch is a normally-closed switch.

5. The controlled NFC tag for pairing with a bluetooth headset according to claim 4, wherein, the electronic switch is integrated with the NFC tag chip, or, the electronic switch and the electronic switch control circuit are integrated with the NFC tag chip.

6. The controlled NFC tag for pairing with a bluetooth headset according to claim 4, wherein, the electronic switch comprises an n-channel or p-channel Junction Field-effect Transistor (JFET), a grid electrode of the JFET being the control terminal of the electronic switch, and a source electrode and a drain electrode of the JFET being the first connection terminal and the second connection terminal of the electronic switch.

7. The controlled NFC tag for pairing with a bluetooth headset according to claim 4, wherein, the electronic switch comprises two tandem n-channel or p-channel depletion-type Metal-Oxide-Semiconductor Field Effect Transistors (MOSFETs) and two protection diodes connected in parallel with the depletion-type MOSFETs, respectively, wherein, grid electrodes of the depletion-type MOSFETs together constitute the control terminal of the electronic switch.

* * * * *